United States Patent
Utermoehlen et al.

(10) Patent No.: US 10,845,216 B2
(45) Date of Patent: Nov. 24, 2020

(54) ROTATIONAL ANGLE SENSOR

(71) Applicant: Robert Bosch GmbH, Stuttgart (DE)

(72) Inventors: Fabian Utermoehlen, Lippstadt (DE); Andreas Merz, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 16/079,795

(22) PCT Filed: Feb. 24, 2017

(86) PCT No.: PCT/EP2017/054283
§ 371 (c)(1),
(2) Date: Aug. 24, 2018

(87) PCT Pub. No.: WO2017/144641
PCT Pub. Date: Aug. 31, 2017

(65) Prior Publication Data
US 2019/0094047 A1    Mar. 28, 2019

(30) Foreign Application Priority Data
Feb. 24, 2016   (DE) .................. 10 2016 202 871

(51) Int. Cl.
*G01D 5/20*    (2006.01)

(52) U.S. Cl.
CPC .................. *G01D 5/2073* (2013.01)

(58) Field of Classification Search
None
See application file for complete search history.

(56) References Cited

U.S. PATENT DOCUMENTS

| 5,239,288 A | 8/1993 | Tsals |
| 6,011,389 A | 1/2000 | Masreliez et al. |
| (Continued) | | |

FOREIGN PATENT DOCUMENTS

| CN | 1339101 A | 3/2002 |
| CN | 1584505 A | 2/2005 |
| (Continued) | | |

OTHER PUBLICATIONS

International Search Report corresponding to PCT Application No. PCT/EP2017/054283, dated Jun. 1, 2017 (German and English language document) (7 pages).

*Primary Examiner* — Jas A Sanghera
(74) *Attorney, Agent, or Firm* — Maginot, Moore & Beck LLP

(57) ABSTRACT

A rotational angle sensor includes a stator element and rotor element. The stator element has a stator transmitting coil, circuit board, and at least two identically configured stator receiving coils angularly offset from each other on the circuit board. The rotor element is mounted rotatably about a rotation axis relative to the stator element, and has a rotor receiving coil and rotor transmitting coil electrically connected to each other. The rotor receiving coil is inductively coupled to the stator transmitting coil such that an electromagnetic field produced by the stator transmitting coil induces a current in the rotor receiving coil that flows through the rotor transmitting coil and causes the rotor transmitting coil produces a further electromagnetic field. The stator receiving coils are inductively coupled to the rotor transmitting coil in a manner configured with reference to a rotational angle between the stator element and the rotor element so that the further electromagnetic field induces at least two angle-dependent alternating voltages in the stator receiving coils. Each stator receiving coil is formed from a plurality of radial conductors and circumferential conduc- (Continued)

tors that are arranged in two levels of the circuit board such that, for each stator receiving coil, at least two oppositely directed partial windings are formed from the radial conductors circumferential conductors. The radial conductors extend radially from an inner end to an outer end and are arranged on the circuit board in sets of two at least partially overlapping conductors with opposite current directions. Each circumferential conductor extends circumferentially, connects two inner ends or two outer ends of respective radial conductors, and has a via providing a change between the levels of the circuit board.

10 Claims, 9 Drawing Sheets

(56) References Cited

U.S. PATENT DOCUMENTS

| | | | |
|---|---|---|---|
| 6,522,128 B1* | 2/2003 | Ely | G01B 7/30 324/207.17 |
| 6,534,970 B1 | 3/2003 | Ely et al. | |
| 2011/0109303 A1* | 5/2011 | Zhitomirsky | G01D 5/204 324/207.15 |
| 2012/0293166 A1 | 11/2012 | Lee et al. | |
| 2012/0293466 A1 | 11/2012 | Jeong et al. | |

FOREIGN PATENT DOCUMENTS

| | | |
|---|---|---|
| CN | 1913303 A | 2/2007 |
| CN | 101048540 A | 10/2007 |
| CN | 101847919 A | 9/2010 |
| CN | 102957231 A | 3/2013 |
| CN | 103812290 A | 5/2014 |
| EP | 0 909 955 B1 | 4/1999 |
| EP | 2 570 776 A1 | 3/2013 |
| EP | 2 570 776 A2 | 3/2013 |
| EP | 2 570 776 A3 | 11/2014 |
| JP | H10-56765 A | 2/1998 |
| WO | 2011/089519 A1 | 7/2011 |

* cited by examiner

ROTATIONAL ANGLE SENSOR

This application is a 35 U.S.C. § 371 National Stage Application of PCT/EP2017/054283, filed on Feb. 24, 2017, which claims the benefit of priority to Ser. No. DE 10 2016 202 871.5, filed on Feb. 24, 2016 in Germany, the disclosures of which are incorporated herein by reference in their entirety.

FIELD OF THE INVENTION

The disclosure relates to a rotational angle sensor which can be used to determine, for example, a rotational angle between a shaft and a further component.

BACKGROUND

In order to measure rotational angles, rotational angle sensors are known, for example, in which a magnet is rotated over a corresponding magnetic field sensor. The measurement of the magnetic field vector then allows the rotational angle to be deduced. Such sensors also react to external magnetic fields, which are caused for example by a current flowing through power cables arranged alongside, and can be very sensitive to interference.

Another type of rotational angle sensor uses an eddy current effect. In this case, for example, a metallic target is moved over sensor coils, which are supplied with an AC voltage and induce an eddy current in the target. This results in a reduction of the inductances of the sensor coils and allows the rotational angle to be deduced from a change in frequency. By way of example, the coils form part of a resonant circuit, the resonant frequency of which shifts when there is a change in the inductance. However, this type of rotational angle sensor can have a high cross sensitivity to installation tolerances (especially tilting of the target). The frequency generated can also be disturbed by external electromagnetic fields (injection locking), since frequencies in the range of a few tens of MHz are usually employed.

EP 0 909 955 B1 discloses a rotational angle sensor comprising planar conductor loops which are short-circuited on a target and interact with the alternating electromagnetic field of an excitation coil.

SUMMARY

Embodiments of the present disclosure can advantageously make it possible to provide a rotational angle sensor which is particularly economic to produce, wherein said rotational angle sensor yields measurement signals that are simple to evaluate.

Ideas relating to embodiments of the present disclosure can be considered to be based, inter alia, on the concepts and insights described below.

The disclosure relates to a rotational angle sensor which can be used in particular in an environment with high electromagnetic interference fields. By way of example, the rotational angle sensor can be used in the engine compartment or in the vicinity of the engine compartment of a vehicle, for example for determining a position of a throttle valve, a rotor position of a BLDC motor, a position of a gas pedal or a position of a camshaft. The rotational angle sensor described below is cost-effective, requires little installation space and is based on a simple measurement principle.

In accordance with one embodiment of the disclosure, the rotational angle sensor comprises a stator element having a stator transmitting coil and at least two identically constructed stator receiving coils, which are angularly offset with respect to one another and are formed in a printed circuit board; a rotor element, mounted rotatably about an axis of rotation with respect to the stator element and having a rotor receiving coil and a rotor transmitting coil, which are electrically connected to one another; wherein the rotor receiving coil is inductively coupled to the stator transmitting coil, such that an electromagnetic field generated by the stator transmitting coil induces a current in the rotor receiving coil, said current flowing through the rotor transmitting coil, such that the rotor transmitting coil generates a further electromagnetic field; wherein the at least two stator receiving coils are inductively coupled to the rotor transmitting coil, such that the inductive coupling is dependent on a rotational angle between the stator element and the rotor element, and the further electromagnetic field generated by the rotor transmitting coil induces at least two angle-dependent AC voltages in the at least two stator receiving coils.

In other words, an AC voltage can be applied to the stator transmitting coil, which AC voltage induces a further AC voltage in the rotor receiving coil by means of an inductive coupling of the stator transmitting coil to the rotor receiving coil. The AC voltage generated in the rotor receiving coil generates a current flow in the rotor transmitting coil, which current flow generates in each case a further AC voltage in the stator receiving coils by means of an inductive coupling of the rotor transmitting coil to the stator receiving coils, which further AC voltage can be measured and a relative rotational angle between the stator element and the rotor element can be determined from the measured values of said further AC voltage.

In particular, the absolute value or the amplitude of the respective induced AC voltage is dependent on the rotational angle. The respective induced AC voltage or Its absolute value can be regarded as a measurement signal of the rotational angle sensor, which measurement signal is provided by the respective stator receiving coil.

In this case, a coil can be defined by a plurality of conductor tracks in or on the printed circuit board, which are all connected in series and which can be energized jointly via connections on the printed circuit board. In this case, the rotor receiving coil and the rotor transmitting coil can be short-circuited in series with one another.

Each of the at least two stator receiving coils is constructed from a plurality of radial conductors and circumferential conductors, which are formed in two planes of a printed circuit board, such that at least two oppositely directed partial windings are formed per stator receiving coil from the radial conductors and the circumferential conductors. The radial conductors and/or circumferential conductors can be constructed in each case from conductor tracks which extend in two planes of the printed circuit board and are connected to one another via plated-through holes, for example. In other words, the radial conductors and/or the circumferential conductors can extend just in sections in a plane of the printed circuit board.

Each of the partial windings of the stator receiving coil is constructed from two radial conductors and two circumferential conductors, which are connected to one another at their ends. In this case, a partial winding can be a part of a coil which comprises conductors which all extend around the same area and/or which are connected in series with one another.

Two partial windings of a coil are oriented in opposite directions if, in the event of a current flow through the coil, current flows through them respectively in the clockwise direction and in the counterclockwise direction.

The radial conductors extend substantially in a radial direction from an inner end to an outer end, wherein in each case two radial conductors having an opposite current direction are arranged in an at least partly overlapping manner on the printed circuit board. By way of example, the radial conductors can all extend radially with respect to a common midpoint and/or with respect to an axis of symmetry of the stator element. Said axis of symmetry can be an axis which corresponds to the axis of rotation of the rotor element upon exact alignment of the stator element with the rotor element. The radial conductors can overlap by virtue of their (with respect to a viewing direction parallel to the axis of symmetry) intersecting (but extending in different planes of the printed circuit board at the point of intersection), or their extending one above another at least in sections in different planes of the printed circuit board (with respect to a viewing direction parallel to the axis of symmetry).

The circumferential conductors extend in a circumferential direction with respect to the axis of symmetry, wherein a circumferential conductor connects in each case two inner ends or in each case two outer ends of radial conductors, and each of the circumferential conductors has a plated-through hole at which the circumferential conductor changes the planes of the printed circuit board. A circumferential conductor can be connected at a first end to a first radial conductor in a first plane of the printed circuit board, then extend in a circumferential direction in the first plane, then change at a center to a second plans of the printed circuit board (by means of the plated-through hole), then extend further in a circumferential direction (and in particular in the same direction) in the second plane of the printed circuit board, and be connected by its second end to a second radial conductor in the second plane of the printed circuit board.

What can be achieved in this way is that the stator receiving coils can all be realized in a compact space in two planes of a printed circuit board. The specific geometry of the stator receiving coils makes it possible to achieve a particularly high coverage of the area available within the stator receiving coil by the stator receiving coil.

In accordance with one embodiment of the disclosure, the circumferential conductors are curved arcuately between a plated-through hole and one end and/or between their ends. The circumferential conductors can be curved overall such that their center lies radially further outward or radially further inward than their ends. In this way, it is possible to provide in the center a plated-through hole for the circumferential conductor of one stator receiving coil which does not touch any circumferential conductors of another stator receiving coil. Between one end and their plated-through hole the circumferential conductors can be curved in a circle-arc-shaped manner.

In accordance with one embodiment of the disclosure, the stator transmitting coil and the stator receiving coils are formed together in two planes of the printed circuit board. Not just the stator receiving coils, the stator transmitting coil, too, which can surround the stator receiving coils, can be formed from conductor tracks in the same two planes or at least in one of the two planes. By virtue of the fact that the coils can be arranged in a maximum of two planes, particularly cost-effective and simple production is possible. In the simplest case, therefore, a merely two-layered printed circuit board is sufficient for the provision of the transmitting/receiving coils on the rotor printed circuit board and on the stator printed circuit board. It should be understood that the printed circuit board can have further planes (that is to say can be a multilayered printed circuit board) in which other conductor tracks of the rotational angle sensor (for example those of an evaluation unit for evaluating the measurement signals) can be formed.

In accordance with one embodiment of the disclosure, the plated-through hole of a circumferential conductor is arranged in a center between the two outer ends or respectively inner end of the respective radial conductors. The center can be defined by its being at an equal distance from the two ends of the circumferential conductor. The plated-through hole in the center of a circumferential conductor can be at a different radial distance from the axis of symmetry than the ends of the circumferential conductor.

In accordance with one embodiment of the disclosure, the plated-through holes of the circumferential conductors connecting the inner ends of the radial conductors lie radially further inward than the respective inner ends, and/or the plated-through holes of the circumferential conductors connecting the outer ends of the radial conductors lie radially further outward than the respective outer ends. In this way, an area that is as large as possible is covered by the respective stator receiving coil.

In accordance with one embodiment of the disclosure, the plated-through holes of the circumferential conductors connecting the inner ends of the radial conductors are arranged at a location of the respective circumferential conductor with minimum distance with respect to an axis of symmetry, and/or the plated-through holes of the circumferential conductors connecting the outer ends of the radial conductors are arranged at a location of the respective circumferential conductor with maximum distance with respect to an axis of symmetry. In this way, the area covered by the respective stator receiving coil can be maximized and the distance between a plated-through hole and other conductor tracks can also be maximized.

In accordance with one embodiment of the disclosure, the inner ends of the radial conductors are all at an identical distance with respect to an axis of symmetry, and/or the outer ends of the radial conductors are all at an identical distance from an axis of rotation. In other words, the partial windings of a stator receiving coil and/or the stator receiving coils can be constructed rotationally symmetrically with respect to the axis of symmetry.

In accordance with one embodiment of the disclosure, a plated-through hole is arranged at the end of a circumferential conductor, which plated-through hole connects an end of a radial conductor to the circumferential conductor in a different plane of the printed circuit board. Such a plated-through hole may be necessary in order that, in the case of the arrangement of a plurality of stator receiving coils, no overlaps arise in two planes of the printed circuit board.

In order to achieve a higher symmetry for the stator receiving coil which, as just described, can comprise an additional plated-through hole in a partial winding, one or more blind plated-through holes can be provided in the stator receiving coil.

In accordance with one embodiment of the disclosure, a blind plated-through hole is provided at the end of a circumferential conductor, which blind plated-through hole connects an end of a radial conductor to the circumferential conductor on the same plane. In this case, a blind plated-through hole is a plated-through hole which indeed electrically connects two planes of the printed circuit board, but to which only conductor tracks of one plane are connected. In the present case, the blind plated-through hole connects a radial conductor and a circumferential conductor. The blind plated-through hole can be arranged symmetrically with respect to a further plated-through hole at an end of a circumferential conductor, for example point-symmetrically with respect to the axis of symmetry.

In accordance with one embodiment of the disclosure, the rotor transmitting coil is divided into at least two partial windings which are oriented in opposite directions. In this way, no current or at least only a small current is induced directly in the rotor transmitting coil by the stator transmitting coil. In other words, a current flowing through the rotor transmitting coils stems from the current flow of the current induced in the rotor receiving coil.

In accordance with one embodiment of the disclosure, the partial windings of the rotor transmitting coil are configured in sickle-shaped fashion. Sickle-shaped partial windings can be delimited by arcuate conductor sections having a varying curvature, which are both curved in the same direction. In particular, the arcuate conductor sections can be circular-arc-shaped and/or have different radii. In this way, the absolute value of the AC voltage induced in a stator receiving coil by the alternating magnetic field of the rotor transmitting coil is dependent on the rotational angle by way of a sine function. A sinusoidal signal dependent on the rotational angle can easily be evaluated and converted into the rotational angle.

By way of example, in the case of two stator receiving coils (a two-phase system), the rotational angle can be determined from the quotient of the two signals by means of the arc tangent. In the case of three stator receiving coils (a three-phase system), the rotational angle can be determined by means of a Clarke transformation of the three signals.

BRIEF DESCRIPTION OF THE DRAWINGS

Embodiments of the disclosure are described below with reference to the accompanying drawings, wherein neither the drawings nor the description should be interpreted as restricting the invention disclosure.

The figures are merely schematic and not true to scale. In the figures, identical reference signs designate identical or identically acting features.

DETAILED DESCRIPTION

Figure 1:
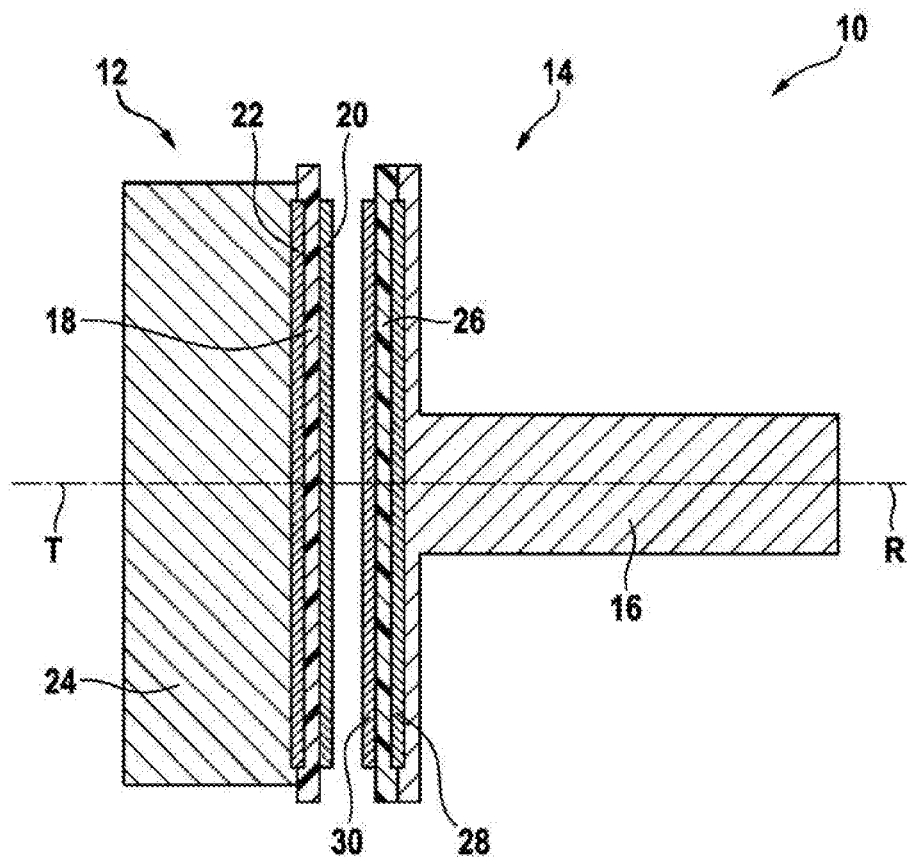
FIG. 1 schematically shows a cross section through a rotational angle sensor in accordance with one embodiment of the disclosure.

FIG. 1 shows a rotational angle sensor 10 composed of a stator element 12 and a rotor element 14. The rotor element 14 can be secured on a shaft 16 of a component, such as, for instance, a throttle valve, a motor, a camshaft, a gas pedal, etc., or can be provided by said shaft 16. The shaft 16 is rotatable about the axis D of rotation and the stator element 12 is situated opposite the rotor element 14 in the corresponding axial direction. By way of example, the stator element 12 is secured to a housing of the component. If the stator element 12 is aligned exactly relative to the shaft 16, the axis T of symmetry of the stator element 12 corresponds to the axis R of rotation.

The stator element 12 comprises a stator printed circuit board 18, on which a stator transmitting coil 20 and a plurality of stator receiving coils 22 are arranged. The conductors of the coils 20, 22 can be arranged just in two planes, for example on the two sides of the stator printed circuit board 18. Further elements for a control unit 24 can be situated on the stator printed circuit board 18. The control unit 24 can supply the stator transmitting coil 20 with an AC voltage (for example having a frequency of between 1 MHz and 20 MHz, for example 5 MHz, and/or having a voltage amplitude in the range of 0.5 V to 10 V, for example 1.5 V) and can determine an induced AC voltage in each stator receiving coil 22. On the basis of these measurements, the control unit 24 can determine a relative rotational angle between the stator element 12 and the rotor element 14.

The rotor element 14 comprises a rotor printed circuit board 26. A rotor receiving coil 28 and a rotor transmitting coil 30 are arranged on the rotor printed circuit board 26. The conductors of the coils 28, 30 can be arranged in just two planes of the rotor printed circuit board 26, for example on the two sides of the rotor printed circuit board 26.

All coils 20, 22, 28, 30 are embodied as planar coils, i.e. as coils which are embodied by means of conductor tracks on and/or in one of the printed circuit boards 18, 26.

Figure 2:
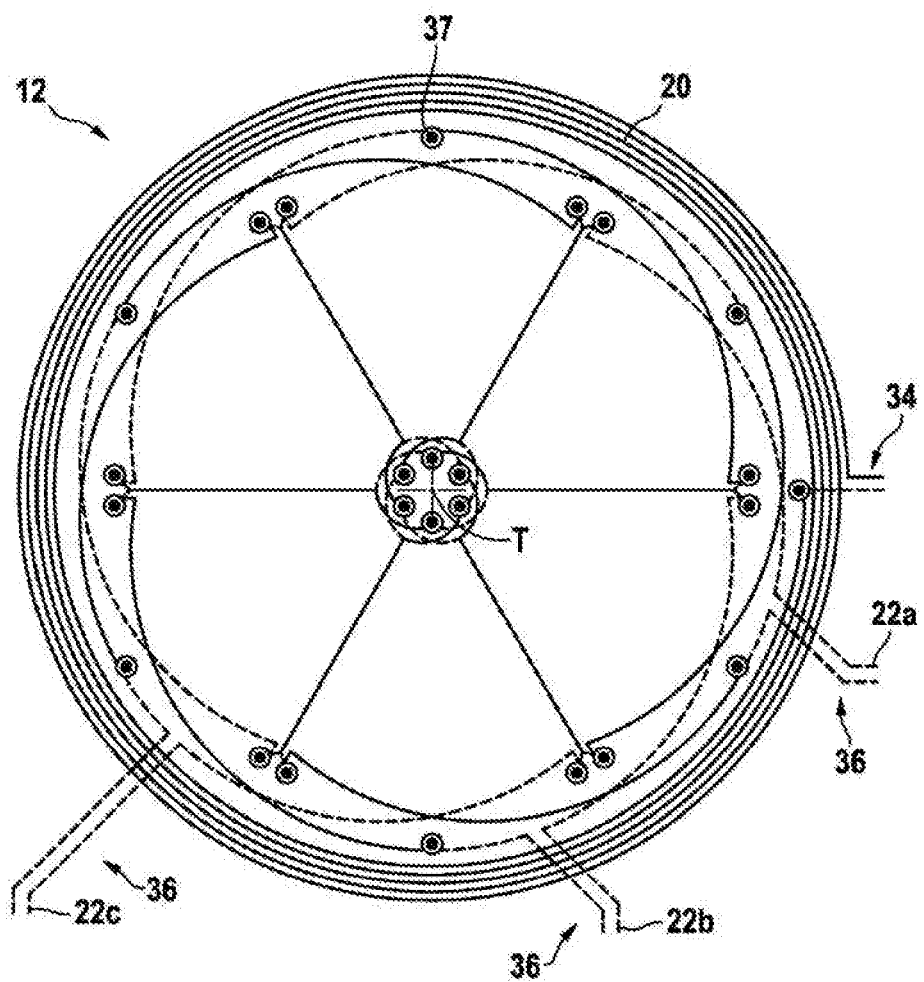
FIG. 2 schematically shows a plan view of a stator element for a rotational angle sensor in accordance with one embodiment of the disclosure.

FIG. 2 shows the coil layout of a stator element 12 in plan view. In FIG. 2 and in the following FIGS., conductor tracks in a first plane of a printed circuit board 18, 26 are illustrated in a solid manner and those in a second plane in a dashed manner.

The stator transmitting coil 20 is arranged in the first plane of the stator printed circuit board 18, which stator transmitting coil can have one or more circumferentially extending, almost circular conductor loops which all extend around the axis T of symmetry, which corresponds (given correct alignment of the stator element 12 and of the rotor element 14 without an offset) to the axis D of rotation of the rotational angle sensor. The external diameter of the stator transmitting coil 20 can be between 10 mm and 40 mm, for example 25 mm. It is also possible for the conductor loops of the stator transmitting coil 20 to be realized in a plurality of planes of a multilayered stator printed circuit board 18 in order to be able to generate a sufficiently large field. The stator transmitting coil 20 is arranged (apart from a portion of its connection 34) in just the first plane of the stator printed circuit board 18.

Three stator receiving coils 22a, 22b, 22c are arranged within the stator transmitting coil 20, which stator receiving coils (apart from their connections 36) are constructed identically and are rotated by 120° with respect to one another. The stator receiving coils 22a, 22b, 22c are arranged only in the first and second planes of the stator printed circuit board 18. In this case, they are contacted via connections 36 in the second plane and then extend alternately in the second and first planes, wherein a change of plane is realized by means of a plated-through hole 37.

Figure 3:
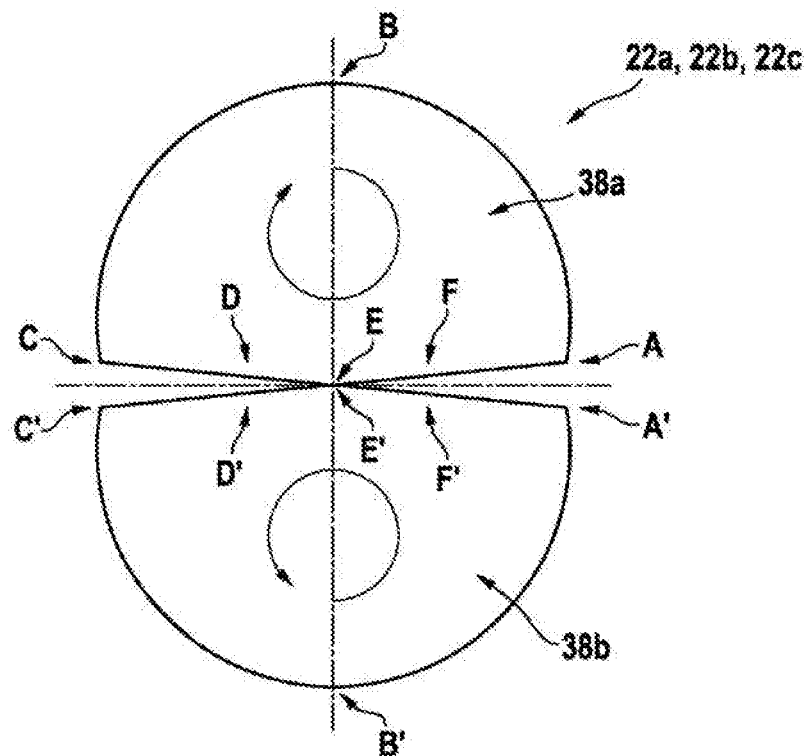
FIG. 3 schematically shows the geometry of a stator receiving coil of a rotational angle sensor in accordance with one embodiment of the disclosure.
Figure 4:
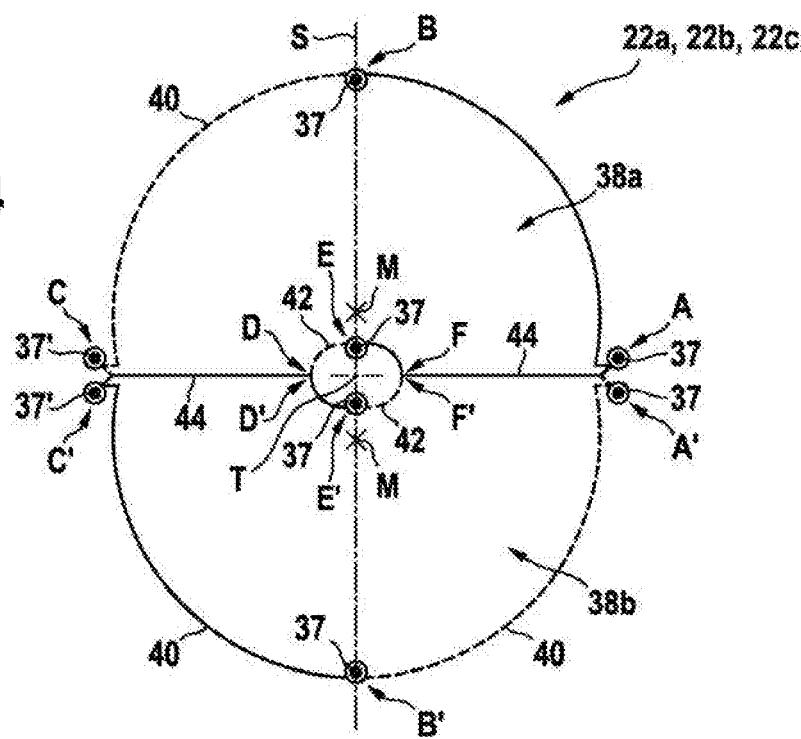
FIG. 4 shows a coil layout for a stator receiving coil of a rotational angle sensor in accordance with one embodiment of the disclosure.

FIG. 3 schematically shows the geometry of an individual stator receiving coil 22a, 22b, 22c while FIG. 4 shows the coil layout of an individual stator receiving coil 22a, 22b, 22c. The connections 36 have been omitted in FIGS. 3 and 4 for reasons of clarity. It should furthermore be mentioned that FIG. 3 shows only the shape, but not the exact course of the conductor tracks of a stator receiving coil 22a, 22b, 22c, while parts of the conductor tracks overlap in FIG. 4.

As is evident from FIGS. 3 and 4, each of the stator receiving coils 22a, 22b, 22c has two partial windings 38a, 38b that are oppositely directed or oriented oppositely with respect to the current flow.

In general it holds true that each stator receiving coil 22a, 22b, 22c can have an even number $2m$ of partial windings 38a, 38b, and that the measurement range Per of the rotational angle sensor 10, which can be for example an integral divisor of 360°, is dependent on the number $2m$ of partial windings 38a, 38b of each stator receiving coil 22a, 22b, 22c, wherein m=360°/Per holds true.

By way of example, with m=1 the stator receiving coils 22a, 22b, 22c from FIGS. 2 and 3 have two partial windings 38a, 38b, which results in a periodicity of 360°.

The same number of partial windings 38a, 38b oriented in one direction and in the other direction has the consequence that the partial voltages induced by the stator transmitting coil 20 (with rotor element 14 absent) compensate for one another in total and 0 V is output as output signal at all the stator receiving coils 22a, 22b, 22c. This can also be used for self-diagnosis, wherein it is possible to recognize that the rotor element 14 is absent or at least has an electrical interruption. Moreover, disturbances on account of EMC influences induce voltages having different signs in each partial winding 38a, 38b, which voltages compensate for one another again as a result of the series connection of the partial windings 38a, 38b (assuming that the disturbances are homogeneous in the region of the partial windings).

In the stator element 12, the three stator receiving coils 22a, 22b, 22c are rotated by an angle ξ with respect to one another, which angle can be calculated in accordance with ξ=Per/3 (here for example 120°). This rotation results in a three-phase electrical system having an electrical phase offset of 120°.

As is evident from FIG. 4, each of the partial windings 38a, 38b is delimited by a radially outer circumferential conductor 40 and a radially inner circumferential conductor 42, which are connected to one another in each case by two radial conductors 44. In FIG. 4, only two of the four radial conductors 44 are discernible, since in each case two radial conductors 44 extend in an overlapping manner one above another in the two planes of the stator printed circuit board 18.

The outer circumferential conductor 40 of the first partial winding 38a starts at the point A. (also illustrated in FIG. 3) at a plated-through hole 37 and then extends in the first plane as far as the point B at its center, where it changes plane at a further plated-through hole. It subsequently extends in the second plane as far as the point C, where it ends at a plated-through hole 37'. The plated-through hole 37' is a so-called blind plated-through hole that connects two conductor tracks on the same plane of the stator printed circuit board 18.

At the point C, the outer circumferential conductor 40, which extends here in the second plane, is connected to a radial conductor 44, which extends in the second plane as far as the point D and transitions there to the inner circumferential conductor 42 of the first partial winding 38a.

The inner circumferential conductor 42 of the first partial winding 38a extends from the point D as far as the point E in the second plane, changes to the first plane at the point E via a plated-through hole and then extends in the first plane as far as the point F, where it transitions to a further radial conductor 44.

The further radial conductor 44 of the first partial winding 38a then extends as far as the point A', at which the second partial winding 38b begins. The latter is constructed just like the partial winding 38a along the points A' to F', except that the two planes of the stator printed circuit board 18 are interchanged.

As will be described in even greater detail further below, the outer circumferential conductors 40 extend on circles whose midpoints are displaced from the axis T of symmetry in such a way that the points B at which a plated-through hole 37 is present have maximum radial distance. The inner circumferential conductors 42 extend on the right and left of the respective plated-through hole also on circles whose midpoints are displaced from the axis T of symmetry, but such that the respective plated-through holes have minimum radial distance.

Figure 5:
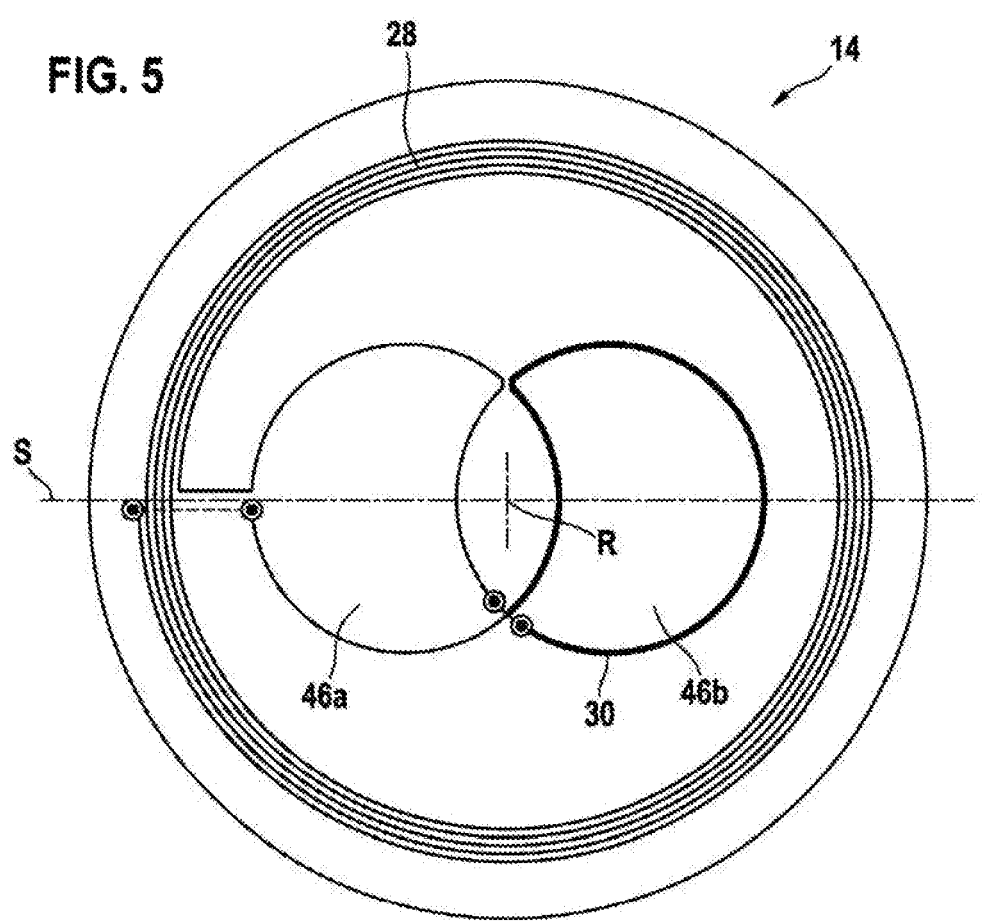
FIG. 5 schematically shows a plan view of a rotor element for a rotational angle sensor in accordance with one embodiment of the disclosure.

FIG. 5 shows a rotor element 14 for the rotational angle sensor 10 from FIG. 1 in plan view, which rotor element comprises a rotor receiving coil 28 and a rotor transmitting coil 30 and can be used together with the stator element. 12 from FIGS. 2 to 4.

The rotor receiving coil 28 is substantially circular, wherein the axis R of rotation represents the midpoint of the rotor receiving coil 28, and surrounds the rotor transmitting coil 30 completely. The rotor receiving coil 28 and the rotor transmitting coil 30 are electrically connected to one another or connected in series with one another by their ends. The rotor receiving coil 28 can extend around the same area as the stator transmitting coil 20 and/or be aligned therewith in relation to the axis R of rotation. Just like the stator transmitting coil 20, the rotor receiving coil 28 can be constructed from a plurality of conductor loops.

The rotor transmitting coil 30 has two oppositely directed partial windings 46a, 46b, which are sickle-shaped in each case (one of which is illustrated in bold for the sake of better identifiability). The first partial winding 46a is oriented in an opposite direction (regarding the current flow) with respect to the second partial winding 46b. The geometries of the partial windings 46a, 46b can be identical. The partial windings 46a, 46b are situated in a manner arranged in an inner region of the rotor transmitting coil 30. The two sickle-shaped partial windings 46a, 46b are formed from substantially circular-arc-shaped conductor sections.

Figure 6:
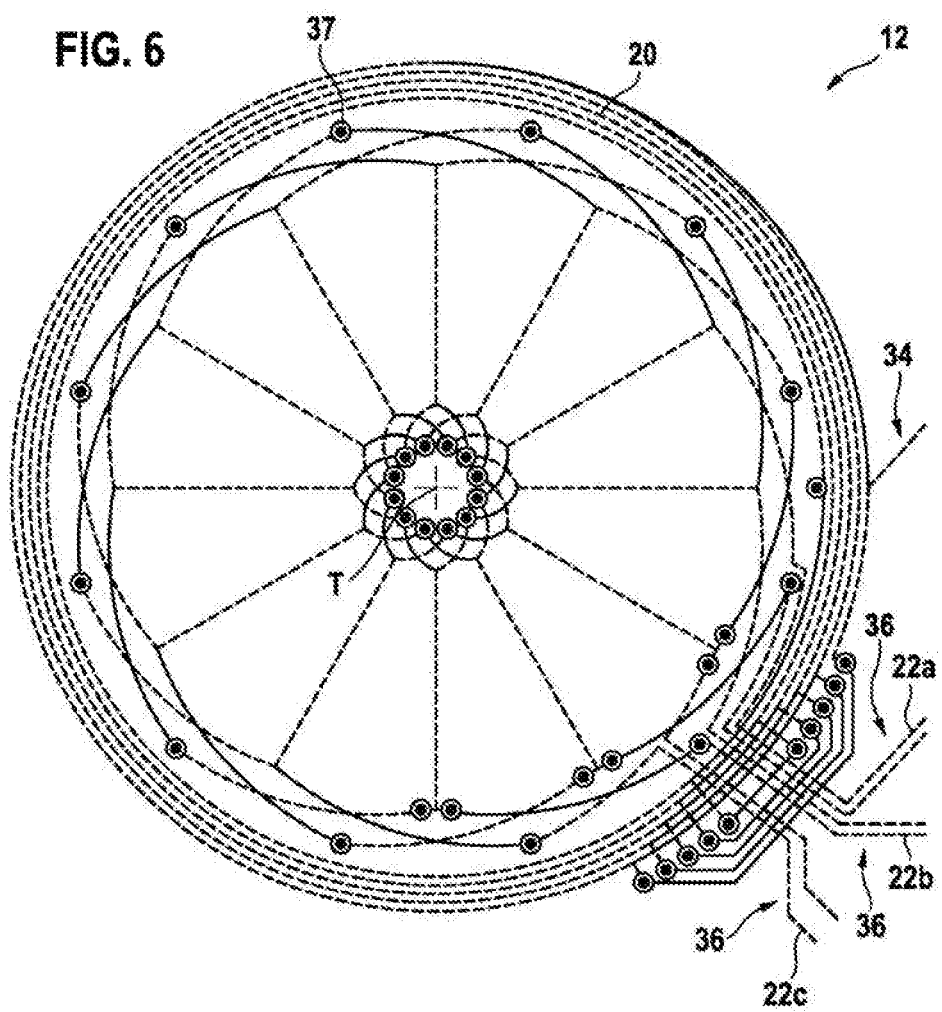
FIG. 6 schematically shows a plan view of a stator element for a rotational angle sensor in accordance with one embodiment of the disclosure.

FIG. 6 shows, analogously to FIG. 2, a coil layout of a stator element 12 in plan view. In the case of the stator element 12 in FIG. 6, the stator transmitting coil 20 is realized in two planes of the stator printed circuit board 18. The stator element in FIG. 6 has three stator receiving coils 22a, 22b, 22c, which are also realized in two planes of the stator printed circuit board 18.

The connections 36 of the stator receiving coils 22a, 22b, 22c leave the inner region which is defined by the stator transmitting coil 20 and in which the stator receiving coils 22a, 22b, 22c are arranged, are led through a section in the second plane in which conductor loops of the stator transmitting coil 20 are interrupted, and are diverted into the first plane via plated-through holes 37. As a result, all coils 20, 22a, 22b, 22c can be formed in just two planes of the stator printed circuit board 18.

Figure 7:
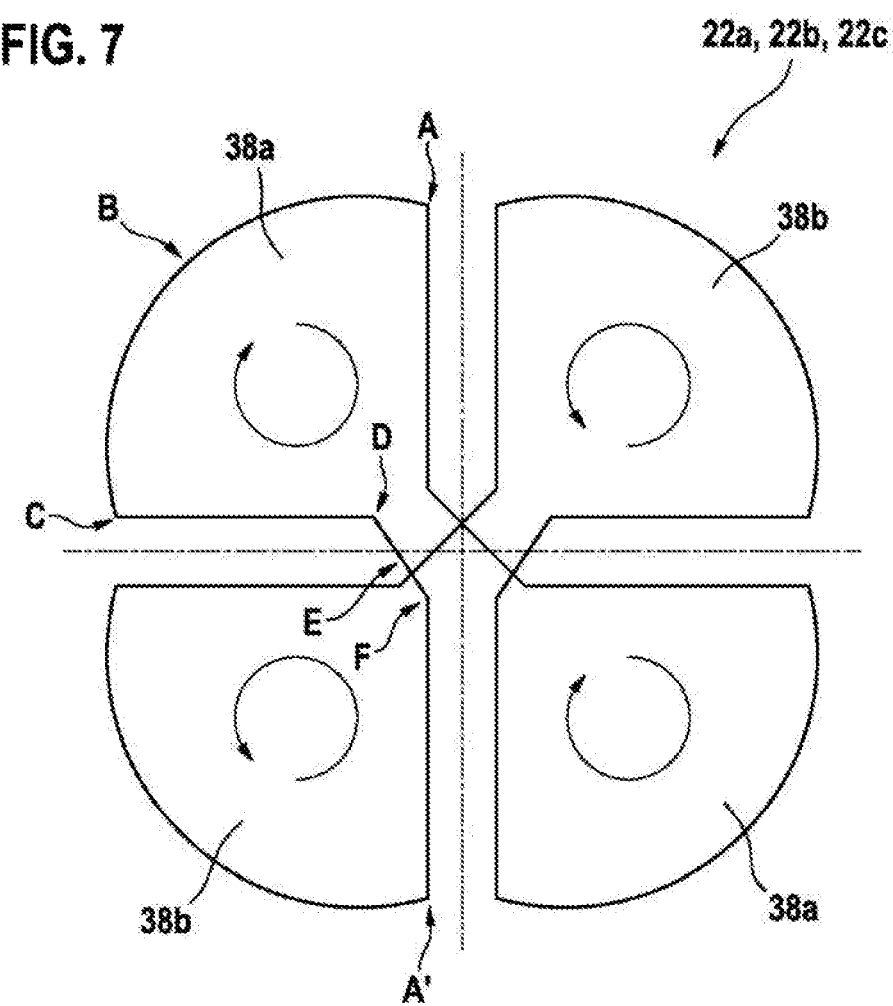
FIG. 7 schematically shows the geometry of a stator receiving coil of a rotational angle sensor in accordance with one embodiment of the disclosure.
Figure 8:
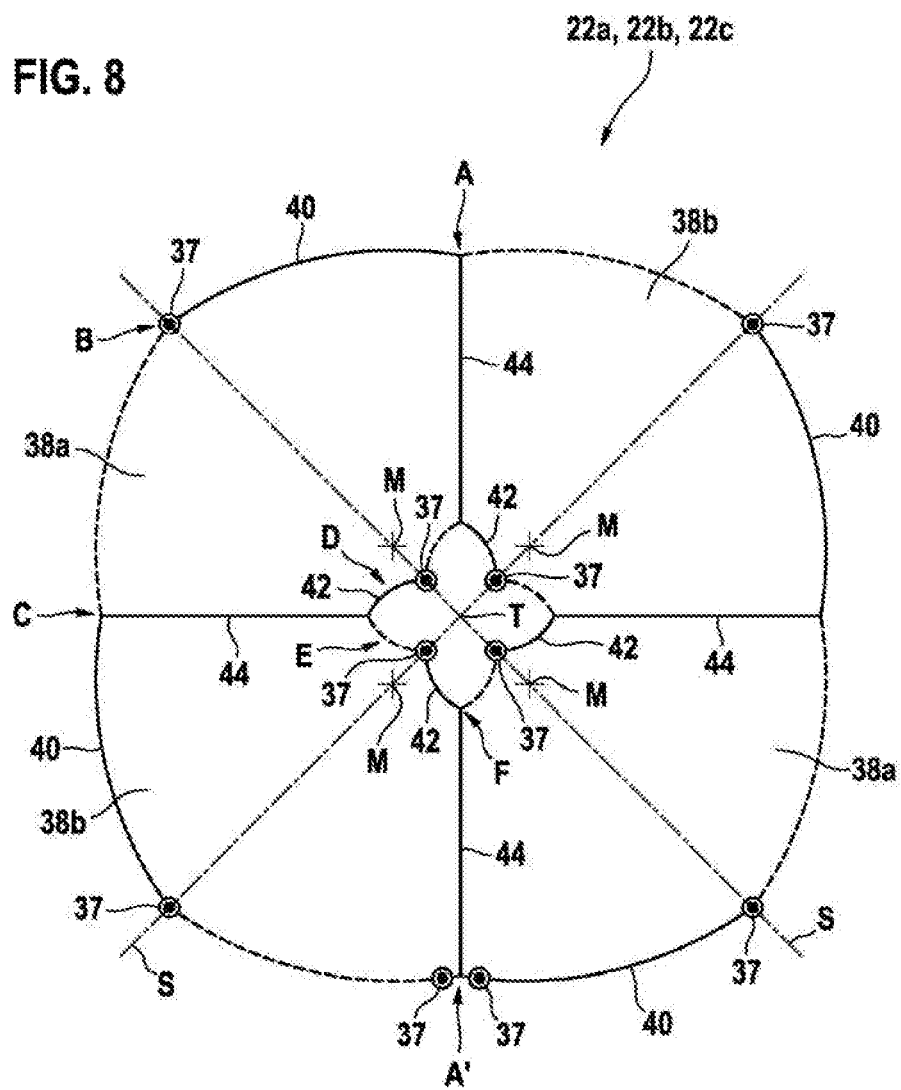
FIG. 8 shows a coil layout for a stator receiving coil of a rotational angle sensor in accordance with one embodiment of the disclosure.

The stator receiving coils 22a, 22b, 22c are described in greater detail by FIGS. 7 and 8 (analogously to FIGS. 3 and 4), in each case an individual stator receiving coil 22a, 22b, 22c being illustrated therein. As is evident from FIG. 7, each of the stator receiving coils 22a, 22b, 22c has four partial windings 38a, 38b, which substantially cover a circular area divide the circular area into four equally sized areas. Two partial windings 38a situated opposite in relation to the axis T of symmetry are oriented in a first direction, and the other two partial windings 38b are oriented in the opposite direction, i.e. in an oppositely directed fashion.

While FIG. 7 schematically shows the interconnection of the conductor tracks of each of the stator receiving coils 22a, 22b, 22c, FIG. 8 shows the layout of the stator receiving coils 22a, 22b, 22c. Each of the partial windings 38a, 38b is led just like the conductor loops from FIG. 4 in the first and second planes of the stator printed circuit board 18 along the points A to A'. In this case, a change of plane takes place at the point A', such that in the case of the subsequent partial windings 38a, 38b the planes in which their conductor tracks extend are interchanged.

As will be described in even greater detail further below, the outer circumferential conductors 40 extend on circles whose midpoints are displaced from the axis T of symmetry in such a way that the points E at which a plated-through hole 37 is present have maximum radial distance. The inner circumferential conductors 42 extend on the right and left of the respective plated-through hole also on circles whose midpoints are displaced from the axis T of symmetry, but such that the respective plated-through holes have minimum radial distance.

Since the stator receiving coils 22a, 22b, 22c in FIGS. 6 to 8 are constructed from four partial windings 38a, 38b in each case (which each cover 90° of the area within the stator transmitting coil 20), they are displaced by 60° relative to one another (see FIG. 6), which results in a measurement range of 180° of the rotational angle sensor 10.

Figure 9:
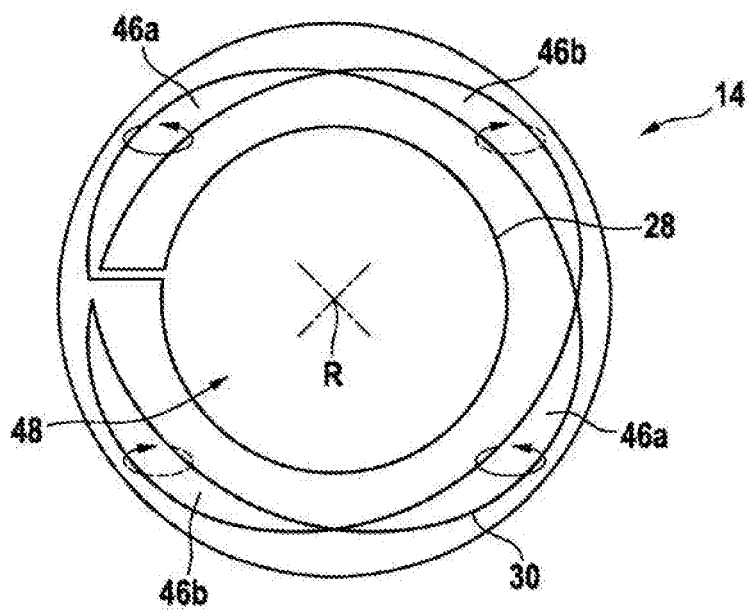
FIG. 9 schematically shows a plan view of a rotor element for a rotational angle sensor in accordance with one embodiment of the disclosure.
Figure 10:
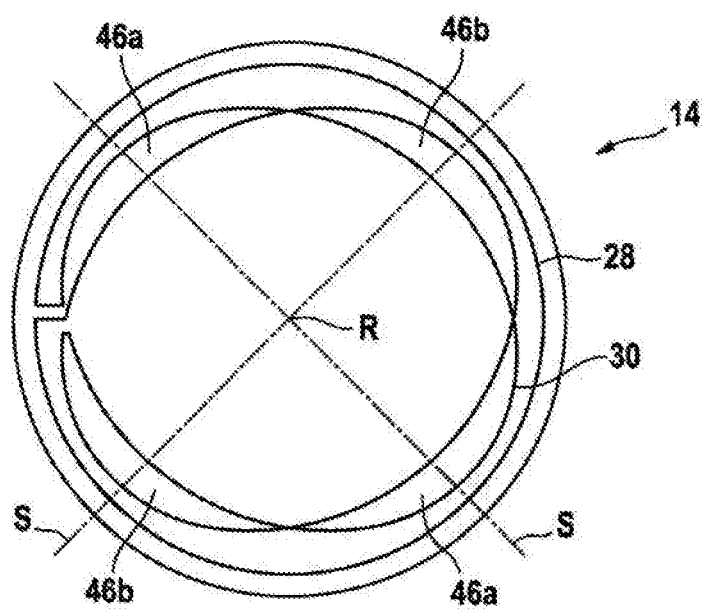
FIG. 10 schematically shows a plan view of a rotor element for a rotational angle sensor in accordance with one embodiment of the disclosure.

FIGS. 9 and 10 show the layout of rotor elements 14 which can be used together with the stator element 12 from FIGS. 6 to 8. In both of FIGS. 9 and 10, the rotor transmitting coil 30 is constructed from four sickle-shaped partial windings 46a, 46b, which surround the axis R of rotation in a circumferential direction and each cover 90°.

In the case of the rotor element 14 from FIG. 9, the rotor receiving coil 28 is arranged within the rotor transmitting coil 30.

By virtue of the sickle-shaped partial windings 46a, 46b of the rotor transmitting coil 30, it is possible to use the inner region 48 within the rotor transmitting coil 30 in order to integrate the rotor receiving coil 28 there. This can have the advantage that, firstly, the rotor element 14 can be made smaller and produced more cost-effectively and, secondly, the amplitude of the AC voltage induced in the rotor receiving coil 28 is not dependent on lateral displacements between the rotor element 14 and the stator element 12.

In FIG. 10, the rotor receiving coil 28 is arranged outside the rotor transmitting coil 28. As a result, a stronger current flow can be generated in the rotor receiving coil 28.

A description will now be given below of a method by which the coil layout for the stator elements 12 from FIG. 4 (measurement range of 360°) and FIG. 8 (measurement range of 180°) can be produced, but is not restricted to these two measurement ranges. For this reason, formulae that are generally valid are indicated.

An optimum utilization of the usually round basic sensor area, i.e. of the area enclosed by the stator transmitting coil 20, can be realized by skillful positioning of a plurality of design circles, from which the partial windings 38a, 38b of the stator receiving coils 22a, 22b, 22c are subsequently assembled. For a respective pair of radially opposite partial windings 38a, 38b (one pair in the case of FIG. 4; two pairs in the case of FIG. 8), the outer circumferential conductors 40 are defined by two design circles which are displaced with respect to one another along the axis S of mirror symmetry of the two partial windings 38a, 38b and the midpoints M of which are situated on said axis S of mirror symmetry.

In the case of a plurality of pairs (number m) of partial windings 38a, 38b, the axes S of mirror symmetry are arranged such that they are in each case displaced by 180°/m with respect to one another, i.e. for example the two axes S of mirror symmetry from FIG. 8 are orthogonal (90°) relative to one another.

The diameter of the design circles can be approximately ⅓ of the diameter of the stator transmitting coil 20, The displacement of in each case two design circles with respect to one another can be between 30% and 50% of their diameter, for example 40%. In this way, firstly it is possible to ensure a maximum area utilization, and secondly it is possible to enable a realization of three rotated stator receiving coils 22a, 22b, 22c in two planes.

In this case, the radial conductors 44 connecting the outer circumferential conductors 40 to the inner circumferential conductors 42 extend radially with respect to the axis T of symmetry. The outer ends of the radial conductors lie at the points of intersection of the design circles around the midpoints M lie.

The inner circumferential conductors 42 can also be defined using design circles, wherein two design circles are used per partial winding 38a, 38b, the midpoints of which design circles are displaced along an axis orthogonally with respect to the axis S of mirror symmetry of the partial windings 38a, 38b. This results in a total of 4 m design circles for the inner circumferential conductors 42. The diameter of the design circles for the inner circumferential conductors 42 is 10% to 20% of the diameter of the design circles for the outer circumferential conductors 40, for example 15%.

In this case, the point of intersection of the two design circles for an inner circumferential conductor 42 which lies nearer to the axis T of symmetry defines the position of the plated-through hole 37.

The rotor transmitting coil 30 (see FIGS. 5, 9 and 10) can also be defined on the basis of a plurality of design circles.

In the case of FIG. 5 (measurement range of 360°), the partial windings 46a, 46b here can be defined by two design circles having the same diameter, the midpoints of which are displaced with respect to one another along an axis S of mirror symmetry of the partial windings 46a, 46b.

In the case of FIGS. 9 and 10, the four partial windings 46a, 46b are defined by one larger design circle around the axis T of symmetry and four smaller design circles, the midpoints of which are displaced along the axes S of mirror symmetry. It has been found that the best measurement signal can be obtained if the ratio of the diameters of the design circles is approximately $\sqrt{2}$.

Figure 11:
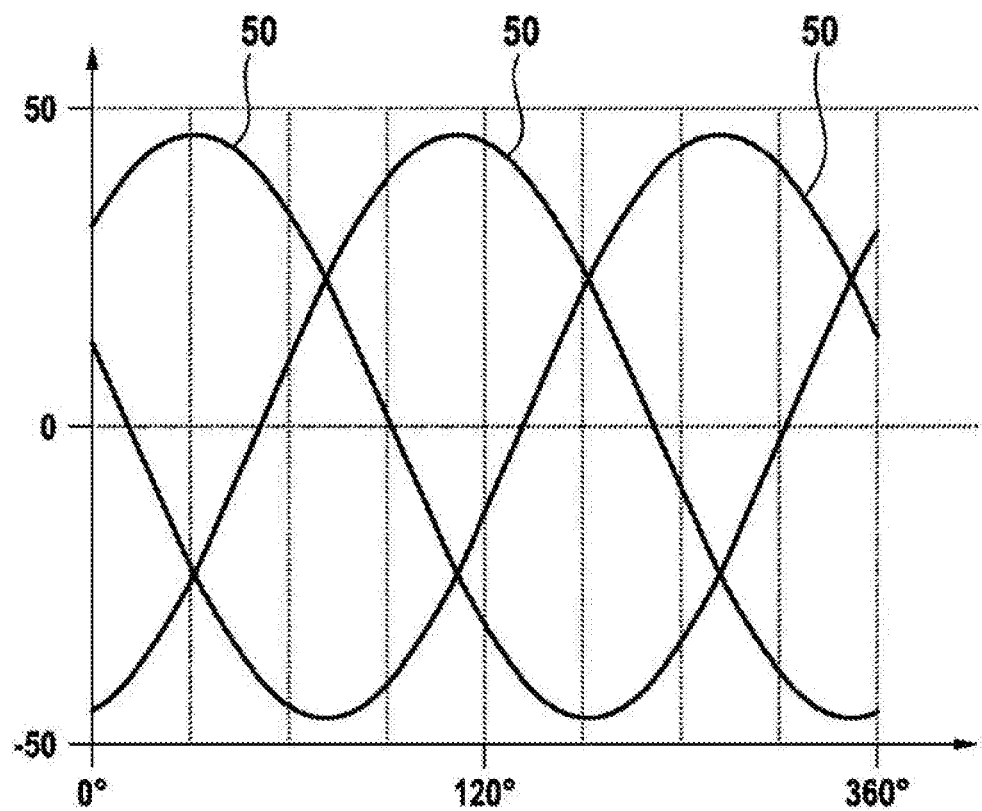
FIG. 11 shows a diagram with measurement signals that are generated by a rotational angle sensor in accordance with one embodiment of the disclosure.

FIG. 11 shows a diagram with three sinusoidal measurement signals 50, which can be emitted by the stator receiving coils 22a, 22b, 22c of a rotational angle sensor 10 on the basis of FIGS. 2 to 5. In the case of a rotational angle sensor 10 on the basis of FIGS. 6 to 10, the measurement range would not extend over 360°, but rather 180°, and the measurement signals 50 would be periodic over this range.

The measurement signals 50 represent, on the y-axis, the amplitude of an AC voltage induced in a stator receiving coil 22a, 22b, 22c, which is dependent on the angle of the rotor element 14 relative to the stator element 12 (x-axis).

On account of leads of different lengths, a positioning of conductor tracks in different planes of the printed circuit board 18 and mechanical tolerances, the measurement signals 50 generally exhibit an offset (i.e. the three measurement signals 50 have a non-symmetrical profile with respect to the x-axis).

This offset can be extracted particularly easily from measurement signals 50 that are as sinusoidal as possible, for example by means of a Clarke transformation. By way of example, there arise in the three stator receiving coils 22a, 22b, 22c three sinusoidal measurement signals 50 with an electrical phase offset of 120° relative to the measurement range β, which can be converted into an offset-free sine/cosine system by application of a Clarke transformation. The rotational angle can then be deduced therefrom with the aid of the arc tangent function.

Measurement signals that are as sinusoidal as possible may also be advantageous because trigonometrical laws such as e.g. $\sin^2 + \cos^2 = 1$ can find application and can be used at least for a plausibilization of the signals or else for a correction.

Finally, it should be pointed out that terms such as "having", "comprising", etc. do not exclude other elements or steps and terms such as "a(n)" or "one" do not exclude a plurality. Reference signs in the claims should not be regarded as restriction.

The invention claimed is:

1. A rotational angle sensor, comprising:
a stator element including:
a stator transmitting coil;
a printed circuit board having a first plane and a second plane; and
at least two identically configured stator receiving coils that are angularly offset with respect to each other, and that are arranged on the printed circuit board, wherein:
each of the at least two stator receiving coils is formed from a respective plurality of radial conductors and a respective plurality of circumferential conductors that are arranged in the two planes of the circuit board such that at least two oppositely directed partial windings are formed per stator receiving coil from the respective plurality of radial conductors and the respective plurality of circumferential conductors;
the plurality of radial conductors each extend in a radial direction from an inner end to an outer end, and are arranged on the printed circuit board in sets of two radial conductors with opposite current directions, the two radial conductors in each of the sets being arranged in a different one of the two planes; and
each of the plurality of circumferential conductors extends in a circumferential direction, and connects two inner ends or two outer ends of two of the radial conductors, and has a respective plated-through hole at which the circumferential conductor changes between the planes of the printed circuit board; and
a rotor element mounted rotatably about an axis of rotation with respect to the stator element, and including a rotor receiving coil and a rotor transmitting coil that are electrically connected to each other;
wherein the rotor receiving coil is inductively coupled to the stator transmitting coil such that an electromagnetic field generated by the stator transmitting coil induces a current in the rotor receiving coil that flows through the rotor transmitting coil and causes the rotor transmitting coil to generate a further electromagnetic field; and
wherein the at least two stator receiving coils are inductively coupled to the rotor transmitting coil such that the inductive coupling between the at least two stator receiving coils and the rotor transmitting coil is configured with reference to a rotational angle between the stator element and the rotor element, and such that the further electromagnetic field generated by the rotor transmitting coil induces at least two angle-dependent AC voltages in the at least two stator receiving coils.

2. The rotational angle sensor as claimed in claim 1, wherein each of the plurality of circumferential conductors is curved arcuately between the respective plated-through hole and at least one end of the circumferential conductor.

3. The rotational angle sensor as claimed in claim 1, wherein the stator transmitting coil and the at least two stator receiving coils are arranged together in the two planes of the printed circuit board.

4. The rotational angle sensor as claimed in claim 1, wherein the plated-through hole of each of the plurality of circumferential conductors is arranged in a center between two outer ends or inner ends of the respective radial conductors.

5. The rotational angle sensor as claimed in claim 1, wherein at least one of:
the plated-through holes of the circumferential conductors connecting the inner ends of the radial conductors lie radially further inward than the respective inner ends;
the plated-through holes of the circumferential conductors connecting the outer ends of the radial conductors lie radially further outward than the respective outer ends;
the plated-through holes of the circumferential conductors connecting the inner ends of the radial conductors are arranged at a location of the respective circumferential conductor with a minimum distance with respect to an axis of symmetry; and
the plated-through holes of the circumferential conductors connecting the outer ends of the radial conductors are arranged at a location of the respective circumferential conductor with a maximum distance with respect to an axis of symmetry.

6. The rotational angle sensor as claimed in claim 1, wherein at least one of:
the inner ends of the plurality of radial conductors are all at an identical distance with respect to an axis of symmetry; and
the outer ends of the plurality of radial conductors are all at an identical distance from an axis of symmetry.

7. The rotational angle sensor as claimed in claim 1, wherein:
a first plated-through hole is arranged at an end of a first circumferential conductor of the plurality of circumferential conductors, the first circumferential conductor being arranged in the first plane; and the first plated-through hole connects the first circumferential conductor to an end of a first radial conductor of the plurality of radial conductors, the first radial conductor being arranged in the second plane.

8. The rotational angle sensor as claimed in claim 7, wherein:
a second plated-through hole is located at an end of a second circumferential conductor, the second circumferential conductor being arranged in the first plane, and connects the end of the first circumferential conductor to a second radial conductor, the second radial conductor being arranged on the second plane; and
the second plated-through hole is arranged symmetrically with respect to a further plated-through hole located at an end of another circumferential conductor.

9. The rotational angle sensor as claimed in claim 1, wherein the rotor transmitting coil is formed from at least two partial windings which are oriented in opposite directions.

10. The rotational angle sensor as claimed in claim 9, wherein the at least two partial windings of the rotor transmitting coil are configured in a sickle-shaped fashion.

* * * * *